US012750554B2

(12) United States Patent
Li et al.

(10) Patent No.: US 12,750,554 B2
(45) Date of Patent: Sep. 29, 2026

(54) INTERACTION METHOD AND APPARATUS, ELECTRONIC DEVICE, AND COMPUTER READABLE STORAGE MEDIUM

(71) Applicant: Beijing Bytedance Network Technology Co., Ltd., Beijing (CN)

(72) Inventors: Yijie Li, Beijing (CN); Xuyuan Xiang, Beijing (CN); Haiqian Wang, Beijing (CN); Linxing Li, Beijing (CN); Cheng Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 213 days.

(21) Appl. No.: 18/550,201

(22) PCT Filed: Feb. 11, 2022

(86) PCT No.: PCT/CN2022/075992

§ 371 (c)(1),
(2) Date: Sep. 12, 2023

(87) PCT Pub. No.: WO2022/188588

PCT Pub. Date: Sep. 15, 2022

(65) Prior Publication Data

US 2024/0314399 A1 Sep. 19, 2024

(30) Foreign Application Priority Data

Mar. 12, 2021 (CN) ......................... 202110268463.6

(51) Int. Cl.
*H04N 21/472* (2011.01)
*G06F 3/048* (2013.01)

(52) U.S. Cl.
CPC ............................. *H04N 21/47217* (2013.01)

(58) Field of Classification Search
CPC .......................... H04N 21/47217; G06F 3/048
See application file for complete search history.

(56) References Cited

U.S. PATENT DOCUMENTS 5,347,477 A * 9/1994 Lee ........................ G06F 1/1656 715/236
5,923,326 A * 7/1999 Bittinger ............... G06F 3/0481 715/805

(Continued)

FOREIGN PATENT DOCUMENTS

CN 102098537 A 6/2011
CN 103686402 A 3/2014

(Continued)

OTHER PUBLICATIONS

Written Opinion of International Search Authority issued Apr. 19, 2022 in International Application No. PCT/CN2022/075992, with English translation (6 pages).

(Continued)

*Primary Examiner* — Nicholas Augustine

(57) ABSTRACT

The present disclosure provides an interaction method and apparatus, an electronic device, and a computer readable storage medium. The interaction method includes: playing first media content in an interaction interface by means of a play control, the interaction interface including a topic control; in response to detecting a trigger operation on the topic control, displaying a first topic information set; and in response to detecting a first trigger operation on first topic information in the first topic information set, playing, by means of the play control, second media content corresponding to the first topic information, the first topic information being related to the first media content.

10 Claims, 5 Drawing Sheets

(56) References Cited

U.S. PATENT DOCUMENTS 6,072,486 A * 6/2000 Sheldon ................ G06F 3/0481 715/835
6,075,534 A * 6/2000 VanBuskirk ............ G06F 3/167 715/978
6,097,380 A * 8/2000 Crites ..................... G06F 9/465 715/246
6,151,059 A * 11/2000 Schein ............... H04N 21/8586 715/721
6,248,946 B1 * 6/2001 Dwek ..................... G06F 16/64 707/E17.101
6,262,724 B1 * 7/2001 Crow .................... G06F 3/0483 715/723
6,341,305 B2 * 1/2002 Wolfe ..................... G06F 16/95 709/219
6,357,042 B2 * 3/2002 Srinivasan ............. H04N 7/165 375/E7.008
6,452,609 B1 * 9/2002 Katinsky ............. G06F 16/4387 709/219
6,624,831 B1 * 9/2003 Shahine ................ G06F 3/0482 715/825
6,727,918 B1 * 4/2004 Nason ....................... G06F 3/14 715/791
6,904,566 B2 * 6/2005 Feller .................. G06F 16/9577 715/728
6,904,599 B1 * 6/2005 Cabrera ................ G06F 3/0631 713/1
6,963,334 B1 * 11/2005 Stevens ............... G06F 3/04883 345/173
6,980,979 B2 * 12/2005 Huang ................ G06F 9/44521
7,113,168 B2 * 9/2006 Oya ...................... G06F 3/0362 345/157
7,386,784 B2 * 6/2008 Capps .................... H04N 21/40 715/200
10,025,875 B2 * 7/2018 Wellen ............... H04N 21/8133
10,320,728 B2 * 6/2019 Patierno .................. H04L 51/10
10,382,823 B2 * 8/2019 Krishnamoorthy .......................... H04N 21/4725
11,380,101 B2 * 7/2022 Chang ................ H04N 21/8456
12,034,995 B2 * 7/2024 Dong .................... H04N 21/431
2004/0212640 A1 * 10/2004 Mann .................... G06F 3/0481 715/792
2005/0013589 A1 * 1/2005 Shah ................ G11B 20/00246 386/290
2006/0020962 A1 1/2006 Stark et al.
2006/0294462 A1 * 12/2006 Blair ..................... G06F 40/274 715/201
2008/0072261 A1 * 3/2008 Ralston ................ G11B 27/034 725/62
2009/0150808 A1 * 6/2009 Aldrey ............... H04N 7/17318 715/764
2010/0281375 A1 * 11/2010 Pendergast ........... G11B 27/036 715/723
2012/0124630 A1 * 5/2012 Wellen ............... H04N 21/4825 725/109
2012/0213495 A1 * 8/2012 Hafeneger ........... G11B 27/034 386/E5.028
2012/0236201 A1 * 9/2012 Larsen ................... G06Q 30/02 348/468
2014/0189602 A1 * 7/2014 Wang ................ H04M 1/72412 715/863
2014/0245145 A1 8/2014 Kim
2014/0250374 A1 * 9/2014 Ohki ..................... G06F 3/0488 715/247
2015/0067505 A1 * 3/2015 Metcalf ................. G06F 16/958 707/751
2015/0242107 A1 * 8/2015 Chen ...................... H04N 23/10 715/765
2016/0163212 A1 * 6/2016 Stuckey ................. G09B 5/065 434/309
2017/0031552 A1 2/2017 Lin
2017/0249058 A1 * 8/2017 Fisher ..................... G06F 16/41
2018/0107353 A1 4/2018 Lee
2018/0343492 A1 11/2018 Konig et al.
2022/0167055 A1 5/2022 Hong et al.
2024/0064370 A1 * 2/2024 Van Os ................... G06F 3/167
2024/0314387 A1 * 9/2024 Avedissian ......... G06Q 30/0261

FOREIGN PATENT DOCUMENTS

CN 104023271 A 9/2014
CN 106851407 A 6/2017
CN 107959877 A 4/2018
CN 109391856 A 2/2019
CN 109951720 A 6/2019
CN 110248251 A 9/2019
CN 110601956 A 12/2019
CN 111031349 A 4/2020
WO 2007078623 A2 7/2007
WO 2017016117 A1 2/2017

OTHER PUBLICATIONS

Office Action issued Jun. 20, 2023 in Chinese Application No. 202110268463.6, with English translation (13 pages).
International Search Report for International Application No. PCT/CN2022/075992, mailed Apr. 19, 2022, 5 Pages.

* cited by examiner

INTERACTION METHOD AND APPARATUS, ELECTRONIC DEVICE, AND COMPUTER READABLE STORAGE MEDIUM

CROSS-REFERENCE TO RELATED APPLICATIONS

The present application and is a U.S. National Stage Application under 35 U.S.C. § 371 of International Patent Application No. PCT/CN2022/075992, filed on Feb. 11, 2022, which claims priority to China Patent Application No. 202110268463.6 filed on Mar. 12, 2021, the disclosure of both of which are incorporated by reference herein in entirety.

TECHNICAL FIELD

The present disclosure relates to an interaction method, an apparatus, an electronic device and a computer-readable storage medium.

BACKGROUND

With the progress of the network technology and the coding and decoding technology, the media content distribution market based on audio and video witnesses a rapid growth, so that a user can obtain various media contents through a terminal device anytime and anywhere.

Various rich media contents are obtained by the user through network distribution, and many media contents may arouse attention and resonance of the users and form hot spots or topics, thereby resulting in continuous attention and discussion of the users.

SUMMARY

The summary is provided to introduce concepts in a concise form, which will be described in detail in the following detailed description. The summary is neither intended to identify the key features or essential features of the technical solution for which protection is sought, nor intended to limit the scope of the technical solution for which protection is sought.

In a first aspect, the embodiments of the present disclosure provide an interaction method comprising: playing first media content in an interaction interface through a play control, the interaction interface comprising a topic control; displaying a first topic information set in response to detecting a trigger operation on the topic control; and playing second media content corresponding to first topic information in the first topic information set through the play control in response to detecting a first trigger operation on the first topic information, the first topic information being related to the first media content.

In some embodiments, the first topic information being related to the first media content comprises: the first topic information being related to a first time point of the first media content and a second time point of the first media content; and the second media content comprises media content starting from the first time point and ending at the second time point.

In some embodiments, the playing of the second media content corresponding to the first topic information in the first topic information set through the play control in response to detecting the first trigger operation on the first topic information comprises: playing the first media content from the first time point through the play control in response to detecting the first trigger operation on the first topic information in the first topic information set.

In some embodiments, the method further comprises: displaying, after the first media content is played in the interaction interface through the play control, the first topic information through the topic control in a case where the first media content is played through the play control to a time point between the first time point and the second time point.

In some embodiments, the method further comprises: determining a play time point for playing the first media content through the play control in response to detecting the first trigger operation on the first topic information in the first topic information set; displaying a cancel control in the play control after the second media content corresponding to the first topic information is played through the play control; and playing the first media content from the play time point through the play control in response to detecting a trigger operation on the cancel control.

In some embodiments, the play control occupies an upper portion of the interaction interface; and the displaying of the first topic information set comprises displaying the first topic information set in a lower portion of the interaction interface in a form of a list.

In some embodiments, the method further comprises: displaying, after the first topic information set is displayed, a second topic information set in response to detecting a second trigger operation on the first topic information in the first topic information set; and playing third media content corresponding to second topic information in the second topic information set through the play control in response to detecting a trigger operation on the second topic information, the second topic information being related to the first topic information.

In some embodiments, the playing of the third media content corresponding to the second topic information through the play control comprises playing the third media content through the play control in a full screen mode; and the interaction method further comprises: displaying associated information of the third media content in the play control in a case where the associated information is obtained; and displaying interaction information in the play control in a case where the interaction information is input through an input control.

In some embodiments, the method further comprises: determining a play time point for playing the first media content through the play control in response to detecting the trigger operation on the second topic information in the second topic information set; displaying a cancel control in the play control after the third media content corresponding to the second topic information is played through the play control; and playing the first media content from the play time point through the play control in response to detecting a trigger operation on the cancel control.

In a second aspect, the embodiments of the present disclosure provide an interaction apparatus, comprising a play module, a display module and a processing module, wherein: the play module is configured to play first media content in an interaction interface through a play control, the interaction interface comprising a topic control; the processing module is configured to control the display module to display a first topic information set in response to detecting a trigger operation on the topic control; and the processing module is further configured to control the play module to play second media content corresponding to first topic information in the first topic information set through the play control in response to detecting a first trigger operation on the first topic information, the first topic information being related to the first media content.

In some embodiments, the first topic information being related to the first media content comprises: the first topic information being related to a first time point of the first media content and a second time point of the first media content; and the second media content comprises media content starting from the first time point and ending at the second time point.

In some embodiments, the playing of the second media content corresponding to the first topic information in the first topic information set through the play control in response to detecting the first trigger operation on the first topic information comprises: playing the first media content from the first time point through the play control in response to detecting the first trigger operation on the first topic information in the first topic information set.

In some embodiments, the processing module is further configured to control, after the play module plays the first media content in the interaction interface through the play control, the topic control to display the first topic information through the display module in a case where the first media content is played through the play control to a time point between the first time point and the second time point.

In some embodiments, the processing module is further configured to determine a play time point for playing the first media content through the play control in response to detecting the first trigger operation on the first topic information in the first topic information set; the display module is further configured to display a cancel control in the play control after the second media content corresponding to the first topic information is played through the play control; and the processing module is further configured to control the play control to play the first media content from the play time point through the play module in response to detecting a trigger operation on the cancel control.

In some embodiments, the play control occupies an upper portion of the interaction interface; and the displaying of the first topic information set comprises displaying the first topic information set in a lower portion of the interaction interface in a form of a list.

In some embodiments, the processing module is further configured to control, after the display module displays the first topic information set, display of a second topic information set through the display module in response to detecting a second trigger operation on the first topic information in the first topic information set; the processing module is further configured to control the play control to play third media content corresponding to second topic information in the second topic information set through the play module in response to detecting a trigger operation on the second topic information, the second topic information being related to the first topic information.

In some embodiments, the playing of the third media content corresponding to the second topic information through the play control comprises playing the third media content through the play control in a full screen mode; the processing module is further configured to display associated information of the third media content in the play control through the play module in a case where the associated information is obtained; and the processing module is further configured to display interaction information in the play control through the play module in a case where the interaction information is input through an input control.

In some embodiments, the processing module is further configured to determine a play time point for playing the first media content through the play control in response to detecting the trigger operation on the second topic information in the second topic information set; the play module is further configured to display a cancel control in the play control after the third media content corresponding to the second topic information is played through the play control; and the processing module is further configured to control the play control to play the first media content from the play time point through the play module in response to detecting a trigger operation on the cancel control.

In a third aspect, the embodiments of the present disclosure provide an electronic device comprising: a memory configured to store computer-readable instructions; and a processor configured to execute the computer-readable instructions to cause the electronic device to implement the method according to any of the embodiments of the above-described first aspect.

In a fourth aspect, the embodiments of the present disclosure provide a non-transitory computer-readable storage medium for storing computer-readable instructions that, when executed by a computer, cause the computer to implement the method according to any of the embodiments of the above-described first aspect.

In a fifth aspect, the embodiments of the present disclosure provide a computer program comprising: instructions that, when executed by a processor, cause the processor to perform the method according to any of the embodiments of the first aspect of the present disclosure.

In a sixth aspect, the embodiments of the present disclosure provide a computer program product comprising: instructions that, when executed by a processor, cause the processor to perform the interaction method according to any of the embodiments of the first aspect of the present disclosure.

The above-described description is only an overview of the technical solution of the present disclosure, which may be implemented according to the content of the specification in order to understand the technical means of the present disclosure more clearly, and detailed description is given below by the following preferred embodiments in conjunction with the accompanying drawings in order to make the above-described and other purposes, features and advantages of the present disclosure more apparent and understandable.

BRIEF DESCRIPTION OF THE ACCOMPANYING DRAWINGS

The above-described and other features, advantages and aspects of embodiments of the present disclosure will become more apparent in conjunction with the accompanying drawings and with reference to the following specific embodiments. Throughout the accompanying drawings, the same or similar reference numerals indicate the same or similar elements. It should be understood that the accompanying drawings are schematic, and the members and elements are not necessarily drawn to scale.

DETAILED DESCRIPTION

Figure 1:
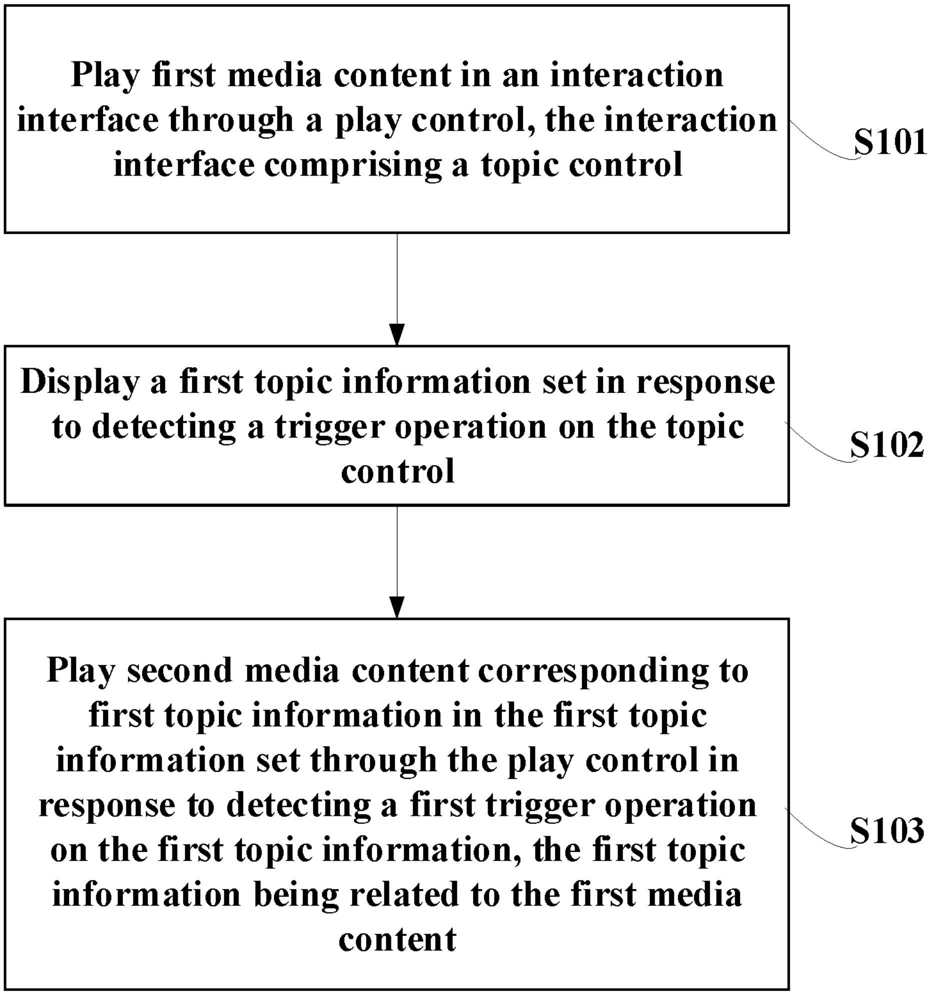
FIG. 1 is a flowchart of an interaction method provided by an embodiment of the present disclosure.

The embodiments of the present disclosure will be described in more detail with reference to the accompanying drawings below. Although the accompanying drawings illustrate some embodiments of the present disclosure, it should be understood that the present disclosure may be implemented in various forms, and should not be construed as being limited to the embodiments set forth herein. Rather, these embodiments are intended for a more thorough and complete understanding of the present disclosure. It should be understood that the accompanying drawings and embodiments of the present disclosure are only for illustrative purposes, rather than for limiting the scope of the present disclosure.

It should be understood that the various steps recited in the method embodiments of the present disclosure may be performed according to different sequences, and/or performed in parallel. In addition, the method embodiments may comprise additional steps and/or omit to perform the illustrated steps. The scope of the present disclosure is not limited in this respect.

As used herein, the term "comprising" and its variants are open-ended inclusion, that is, "comprising but not limited to". The term "based on" means "at least partially based on". The term "one embodiment" means "at least one embodiment"; the term "another embodiment" means "at least one additional embodiment"; and the term "some embodiments" means "at least some embodiments". The related definitions of other terms will be given in the following description.

It should be noted that the concepts such as "first" and "second" mentioned in the present disclosure are only used to distinguish different devices, modules or units, but not to limit the order or interdependence of functions performed by these devices, modules or units.

It should be noted that the modifications of "one" and "a plurality of" mentioned in the present disclosure are illustrative rather than restrictive, and those skilled in the art should understand that they should be understood as "one or more" unless contextually specified otherwise.

The inventors of the present disclosure have found that in the related art, a creator of media content or a manager who distributes the media content may mark a corresponding topic for the media content, so that the user can specify the topic corresponding to the media content after obtaining the media content. However, the user who obtains the media content might not notice the corresponding topic for various reasons, or might be unable to correspond the topic to a specific part of the media content, so that it is impossible to specify a correlation between the topic and the media content, and there is a technical problem of poor use experience.

In view of this, the embodiments of the present disclosure provide an interaction method to allow the user to browse the media content corresponding to the topic information conveniently and quickly, thereby improving the use experience of the user. The interaction method according to some embodiments of the present disclosure will be described in detail in conjunction with the accompanying drawings.

FIG. 1 is a flowchart of an interaction method provided by an embodiment of the present disclosure. The interaction method provided by the embodiment may be performed by an interaction apparatus, wherein the interaction apparatus may be implemented as software or as a combination of software and hardware, and the interaction apparatus may be integrated in a device in a interaction system, for example, a terminal device. As shown in FIG. 1, the method comprises the following steps S101 to S103.

In step S101, first media content is played in an interaction interface through a play control, the interaction interface comprising a topic control.

In the step S101, for example, an interaction interface is displayed on a screen of the terminal device, such that the interaction interface may fill the screen or occupy a part of the screen. A play control is displayed in the interaction interface, and the first media content is played through the play control. The first media content may comprise audio and video content, for example, video with sound, video without sound, or pure audio. The play control may fill the interaction interface or occupy a part of the interaction interface. For example, the play control occupies an upper portion of the interaction interface. The interaction interface comprises a topic control. For example, the topic control is configured to receive a trigger operation of the user. Optionally, the topic information can be displayed through the topic control in the interaction interface. As understood by those skilled in the art, the topic or the topic information can be regarded as an item of information, for example, hotspot information, news, anecdotes, or the like.

In step S102, a first topic information set is displayed in response to detecting a trigger operation on the topic control.

In the step S102, the terminal device displays the first topic information set in response to detecting the trigger operation on the topic control. For example, if the terminal device receives a trigger operation of the user by the topic control, an input signal will be detected from the topic control, so that the terminal device determines that a trigger operation on the topic control by the user is detected and displays the first topic information set. The first topic information set comprises one or more topic information. Optionally, the first topic information set is displayed in a form of a list.

In step S103, second media content corresponding to first topic information in the first topic information set is played through the play control in response to detecting a first trigger operation on the first topic information, the first topic information being related to the first media content.

The first topic information set comprises the first topic information, and in the step S103, the terminal device plays the second media content corresponding to the first topic information by the play control in response to detecting the first trigger operation on the first topic information in the first topic information set. The first topic information is related to the first media content. For example, the first topic information originates from the first media content. As an example, the first media content comprises a music competition program, the content of which comprises five singers each singing a song and participating in the final scoring. The third singer sings a whistle register when singing a song, and then forms topic information "singer xx whistle register", that is, the topic information "singer xx whistle register" is related to the first media content. In the embodiments of the present disclosure, the second media content corresponds to the first topic information, so that the second media content corresponding to the first topic information is played through the play control in the interaction interface of the terminal device in response to detecting a trigger operation on the first topic information, enabling the user to immediately watch the second media content corresponding to the first topic information, thereby improving the experience of the user.

So far, an interaction method according to some embodiments of the present disclosure is provided. The interaction method comprises: playing first media content in an interaction interface through a play control, the interaction interface comprising a topic control; displaying a first topic information set in response to detecting a trigger operation on the topic control; and playing second media content corresponding to first topic information in the first topic information set through the play control in response to detecting a first trigger operation on the first topic information, the first topic information being related to the first media content. The above-described method enables the user to browse the media content corresponding to the topic information conveniently and quickly, thereby improving the use experience.

In one optional embodiment, the first topic information being related to the first media content comprises: the first topic information being related to a first time point of the first media content and a second time point of the first media content; and the second media content comprises media content starting from the first time point and ending at the second time point.

Generally, the first media content has a time length. For example, the first media content is a video with sound, a video without sound, or pure audio having a time length, and the first topic information may be related to all or part of the first media content having a time length. For example, if the first topic information is related to a starting point and an end point of the first media content, it may be understood that the first topic information is related to an entirety of the first media content. For another example, the first topic information is related to part of the first media content. Referring to the aforementioned example, the first media content comprises an audio-video program of music competition for a length of 20 minutes, the content of which comprises five singers each singing a song and participating in the final scoring, wherein the third singer sings a whistle register while singing the song during the 10th minute to the 15th minute of the first media content, and then the topic information "singer xx whistle register" is formed. It may be considered that the topic information "singer xx whistle register" is related to the first time point, i.e., the 10th minute and the second time point, i.e., the 15th minute of the first media content, or it may also be considered that the topic information "singer xx whistle register" is related to a segment between the first time point, i.e., the 10th minute and the second time point, i.e., the 15th minute of the first media content.

In the above-described optional embodiment, the second media content comprises media content starting from the first time point and ending at the second time point. Continuing to refer to the aforementioned example, in step S101, the terminal device plays the audio-video program of music competition for a total length of 20 minutes through the play control in the interaction interface, in step S102, the terminal device detects a trigger operation on the topic control by the user, and then displays the first topic information set, wherein the first topic information set comprises the first topic information "singer xx whistle register", and in step S103, the terminal device detects a trigger operation on the topic information "singer xx whistle register" in the first topic information set by the user. Since the topic information "singer xx whistle register" corresponds to a part of the first media content for a total duration of 5 minutes from the 10th minute to the 15th minute when the singer sings the whistle register while singing the song, and the second media content comprises the part for a total duration of 5 minutes, the terminal device plays the second media content through the play control of the interaction interface, that is, the part of the first media content for a total duration of 5 minutes from the 10th minute to the 15th minute when the singer sings a whistle register is played. By means of the above-described method, during the process when the user plays the first media content through the terminal device, the first topic information set can be displayed by triggering the topic control, and the first topic information related to the first media content can be found in the first topic information set, and then the second media content corresponding to the first topic information can be browsed by a further trigger operation, so that the user can conveniently browse the media content corresponding to the topic that the user is interested in, thereby improving the experience of the user.

In one optional embodiment, the playing of the second media content corresponding to the first topic information in the first topic information set through the play control in response to detecting the first trigger operation on the first topic information comprises: playing the first media content from the first time point through the play control in response to detecting the first trigger operation on the first topic information in the first topic information set. As mentioned above, since the second media content comprises media content starting from the first time point of the first media content and ending at the second time point of the first media content, and the terminal device is playing the first media content in step S101, in response to detecting the first trigger operation on the first topic information in the first topic information set, the playing can be directly positioned at the first time point of the first media content, so that the playing of the second media content is implemented. By way of such operation method, a series of complicated operations such as re-requesting the media content source or reloading the media content can be avoided by the terminal device, which improves the processing efficiency.

In one optional embodiment, the method further comprises: displaying, after the first media content is played in the interaction interface through the play control, the first topic information through the topic control in a case where the first media content is played through the play control to a time point between the first time point (inclusive) and the second time point (inclusive). As mentioned previously, in step S101, the terminal device plays the first media content by the play control, and detects a trigger operation on the topic control by the user during the playing process, so as to, through steps S102 and S103, display the first topic information set and play the second media content corresponding to the first topic information related to the first time point and the second time point of the first media content by the play control. Further, the second media content may also be media content between the first time point and the second time point of the first media content. Thus, the first topic information can be displayed, starting at any time point between the first time point and the second time point, after the first media content is played through the play control in step S101, so as to prompt the user that the first topic information is related to the media content played between the currently first and second time points, thereby stimulating the interest of the user in the first topic information. Referring to the aforementioned example, in step S101, the terminal device plays the first media content with a duration of 20 minutes by the play control, and displays the topic information "singer xx whistle register" by the topic control when playing to the period from the 10th minute to the 15th minute, i.e., within a range of a duration of 5 minutes during which the singer sings a whistle register when singing a song, thereby stimulating the interest of the user in the topic information and performing a trigger operation on the topic control.

In one optional embodiment, the method further comprises: determining a play time point for playing the first media content through the play control in response to detecting the first trigger operation on the first topic information in the first topic information set; displaying a cancel control in the play control after the second media content corresponding to the first topic information is played through the play control; and playing the first media content from the play time point through the play control in response to detecting a trigger operation on the cancel control. During the process when the user browses the first media content through the play control in the interaction interface, when the user browses to a time point A of the first media content, the first topic information set is displayed by triggering the topic control, and the first topic information in the first topic information set is further triggered to switch to playing the second media content. However, since the user might still wish to continue browsing the first media content from the time point A after browsing the second media content for a certain period of time, in the optional embodiment, after the user triggers the play control to play the second media content through the topic control and the first topic information list, a cancel control is displayed in the play control. When the user triggers an operation through the cancel control, the terminal device may control the play control to play the first media content from the previous time point A in response to detecting the trigger operation on the cancel control, so that the user can continue to browse the first media content from the time point A.

Figure 2:
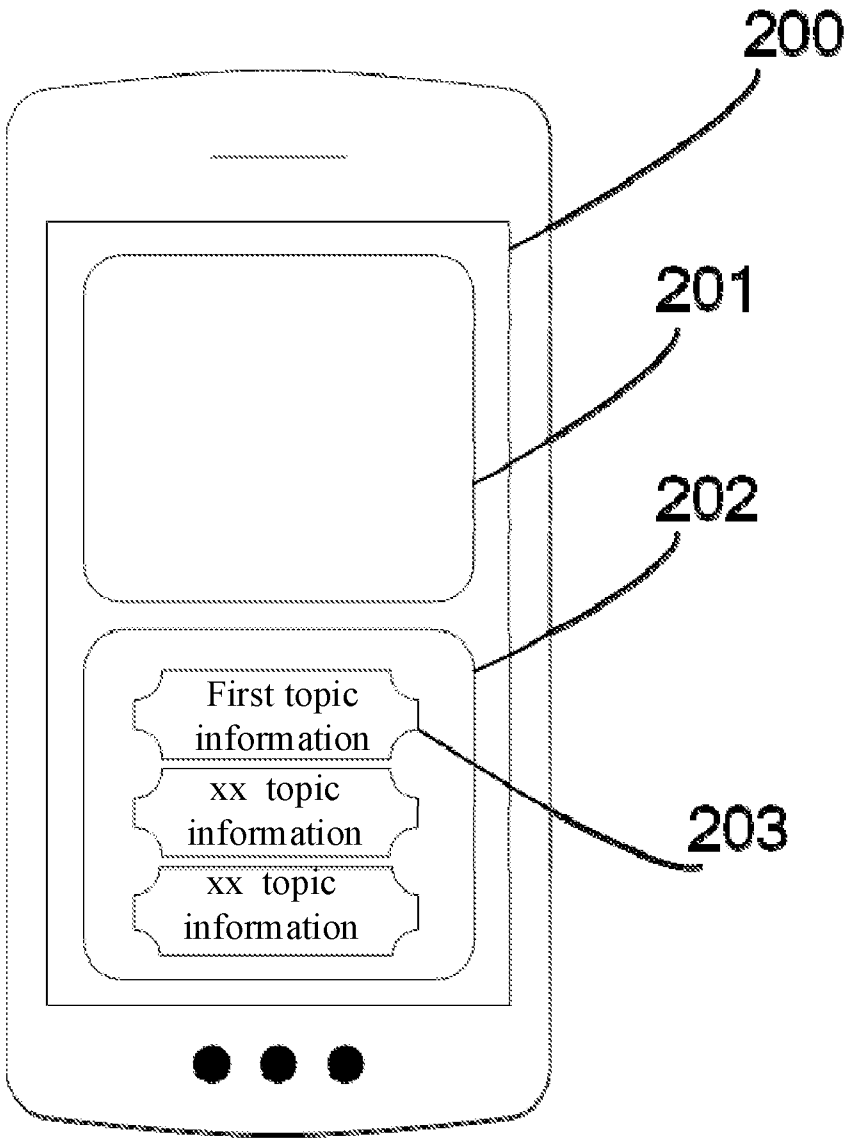
FIG. 2 is a schematic view of an interaction interface provided by an embodiment of the present disclosure.

In one optional embodiment, the play control occupies an upper portion of the interaction interface; and the displaying of the first topic information set comprises displaying the first topic information set in a lower portion of the interaction interface in a form of a list. FIG. 2 is a schematic view of an interaction interface provided by an embodiment of the present disclosure. Referring to FIG. 2, an interaction interface 200 is displayed on the screen of the terminal device, and the interaction interface 200 comprises a play control 201. In response to detecting a trigger operation on a topic control in the interaction interface 200, a first topic information set 202 is displayed in the form of a list, wherein the first topic information set 202 comprises a first topic information 203. In FIG. 2, for example, the first media content is played through the play control 201, and the first topic information set 202 is displayed in response to detecting a trigger operation on the topic control in the interaction interface 200, wherein the first topic information set 202 comprises the first topic information 203. In response to detecting a first trigger operation on the first topic information 203, second media content corresponding to the first topic information 203 is played through the play control 201.

In a further optional embodiment, the method further comprises: displaying, after the first topic information set is displayed, a second topic information set in response to detecting a second trigger operation on the first topic information in the first topic information set; and playing third media content corresponding to second topic information in the second topic information set through the play control in response to detecting a trigger operation on the second topic information, the second topic information being related to the first topic information. As mentioned previously, the terminal device displays a first topic information set in response to detecting a trigger operation on the topic control. Further, a second topic information set is played after the terminal device detects a first trigger operation on the first topic information in the first topic information set, wherein the second topic information set comprises second topic information. Third media content corresponding to the second topic information is played through the play control after the terminal device detects a trigger operation on the second topic information, wherein the second topic information is related to the first topic information. Referring to the aforementioned example, the first media content comprises an audio-video program of music competition for a total length of 20 minutes, the content of which comprises five singers each singing a song and participating in the final scoring. The third singer sings a whistle register during the 10th minute to the 15th minute of the first media content when singing a song, and then the first topic information “singer xx whistle register” is formed. When the terminal device performs the interaction method provided by the embodiment of the present disclosure, in step S101, the first media content, that is, the audio-video program of music competition for 20 minutes is played through the play control, and the topic control is displayed when playing to the 11th minute, the topic control displaying the first topic information “singer xx whistle register”. In step S102, the terminal device displays a first topic information set in response to detecting a trigger operation on the topic control, the first topic information set comprising the first topic information. In step S103, the terminal device displays a second topic information set in response to detecting a first trigger operation on the first topic information in the first topic information set, wherein the second topic information set comprises second topic information, the second topic information being related to the first topic information. For example, the second topic information comprises “user xxx whistle register”, and thus, the second topic information is related to the first topic information “singer xx whistle register”. After the terminal device detects a trigger operation on the second topic information, third media content corresponding to the second topic information is played through the play control. The third media content may comprise an audio-and-video of a whistle register formed by singing of the user xxx. By way of the above-described method, the second topic information associated with the first topic information related to the first media content can be provided for the user who uses the terminal device through the first topic information set and the second topic information set, thereby helping the user to find the media content of interest and improving the experience of the user.

Figure 3:
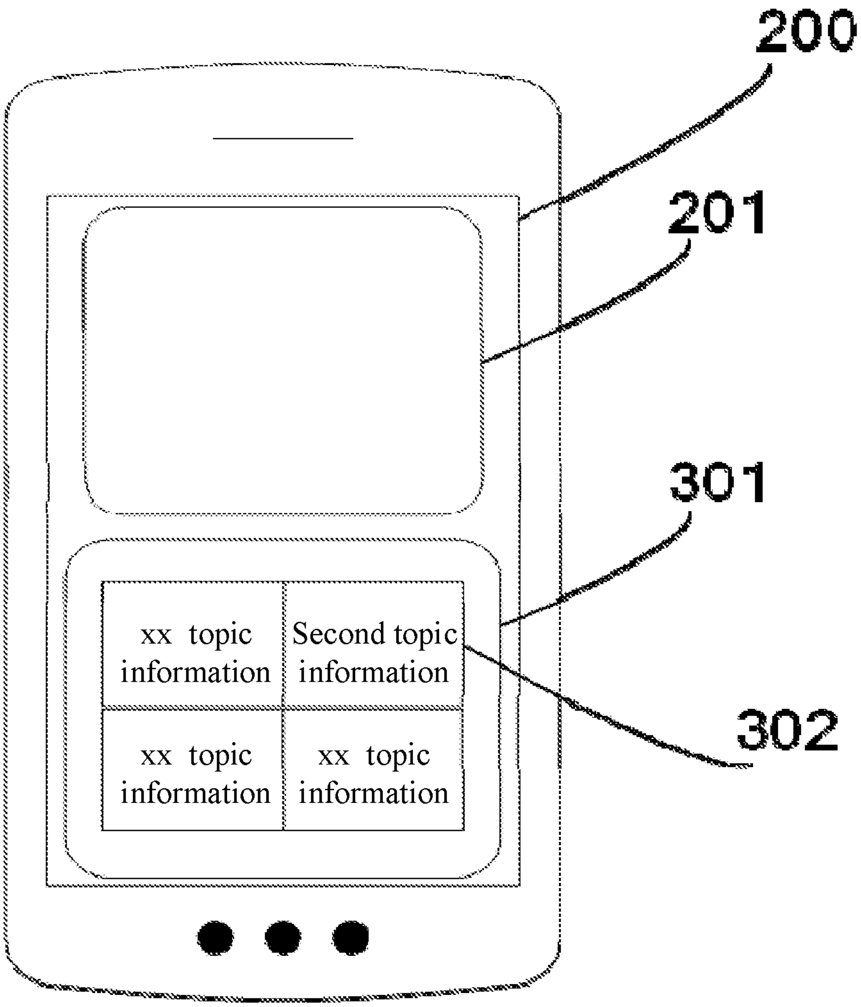
FIG. 3 is a schematic view of an interaction interface provided by another embodiment of the present disclosure.

FIG. 3 is a schematic view of an interaction interface provided by another embodiment of the present disclosure. Based on the interaction interface shown in FIG. 2, the interaction interface shown in FIG. 3 is displayed in response to detecting a first trigger operation on the first topic information 203 in the first topic information set 202 in FIG. 2. Referring to FIG. 3, an interaction interface 200 is displayed on the screen of the terminal device, and the interaction interface 200 comprises a play control 201. Moreover, a second topic information set 301 is also displayed in the interaction interface 200, wherein the second topic information set 301 comprises second topic information 302. That is, in the interaction interface shown in FIG. 2, the second topic information set 301 as shown in FIG. 3 is displayed in response to detecting a first trigger operation on the first topic information 203 in the first topic information set 202. In response to detecting a second trigger operation on the second topic information 302 in the second topic information set 301, the third media content corresponding to the second topic information 302 is played in the play control 201.

As one optional embodiment, the playing of the third media content corresponding to the second topic information through the play control comprises playing the third media content through the play control in a full screen mode; and the method further comprises: displaying associated information of the third media content in the play control in a case where the associated information is obtained; and displaying interaction information in the play control in a case where the interaction information is input through an input control. Referring to the aforementioned embodiments, after the terminal device detects the trigger operation on the second topic information in the second topic information set, the third media content is played in a full screen mode. The third media content comprises, for example, an audio-and-video of whistle register formed by singing of the user xxx, and the associated information and the interaction information comprise bullet screen information. The terminal device, for example, obtains bullet screen information associated with the third media content from a server and scrolls the bullet screen information in the play control, and may also receive the bullet screen information input by the user and scroll the bullet screen information in the play control at the same time.

As one optional embodiment, the method further comprises: determining a play time point for playing the first media content through the play control in response to detecting the trigger operation on the second topic information in the second topic information set; displaying a cancel control in the play control after the third media content corresponding to the second topic information is played through the play control; and playing the first media content from the play time point through the play control in response to detecting a trigger operation on the cancel control. For a corresponding implementation, reference may be made to the relevant description of playing the second media content after the first trigger operation on the first topic information in the first topic information set, and switching from playing the second media content to playing the first media content through the cancel control, which will not be described in detail here.

Figure 4:
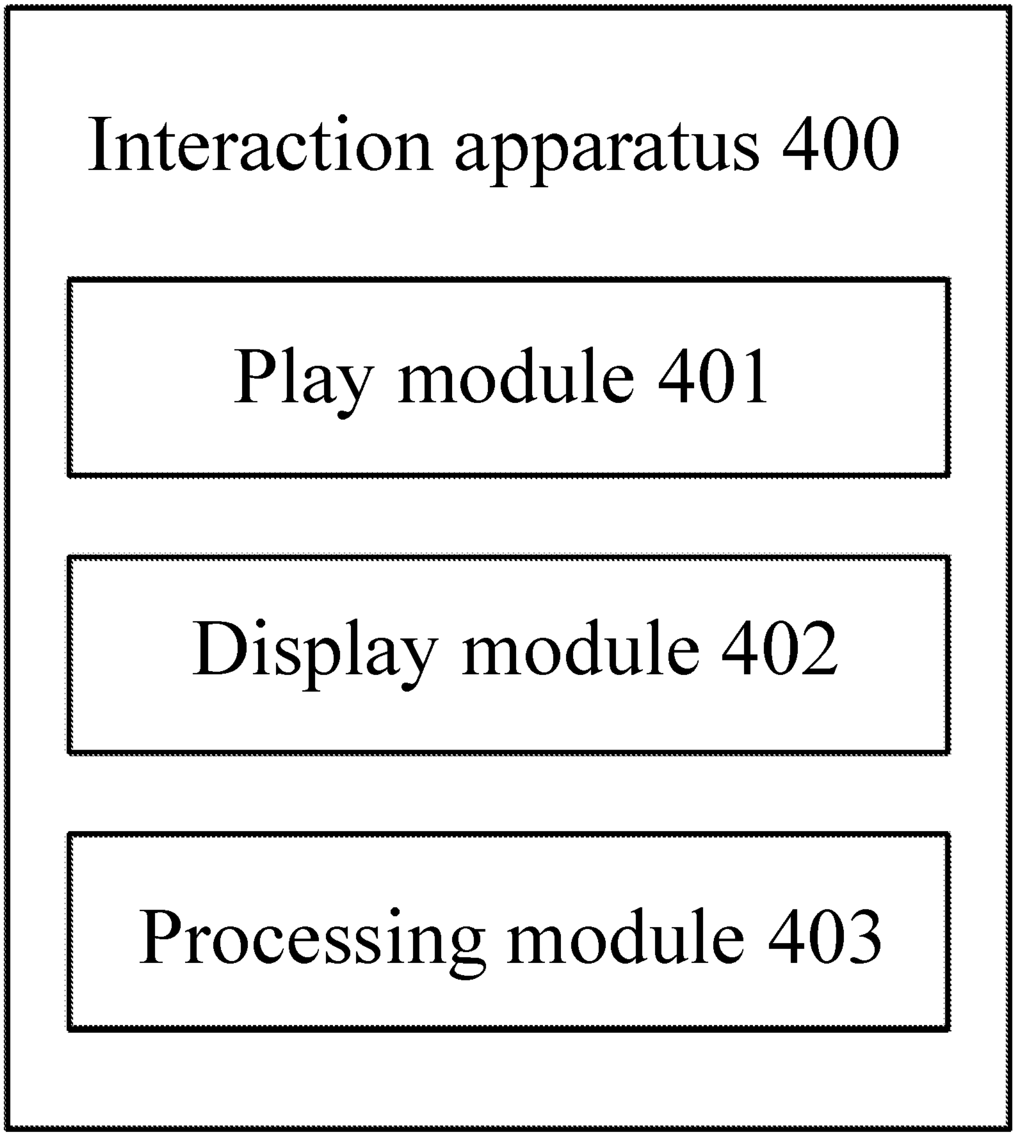
FIG. 4 is a schematic view of a structure of an embodiment of an interaction apparatus provided by an embodiment of the present disclosure.

FIG. 4 is a schematic view of a structure of an embodiment of an interaction apparatus provided by an embodiment of the present disclosure. As shown in FIG. 4, the apparatus 400 comprises a play module 401, a display module 402, and a processing module 403.

The play module 401 is configured to play first media content in an interaction interface through a play control, the interaction interface comprising a topic control.

The processing module 403 is configured to control the display module 402 to display a first topic information set in response to detecting a trigger operation on the topic control.

The processing module 403 is further configured to control the play module 401 to play second media content corresponding to first topic information in the first topic information set through the play control in response to detecting a first trigger operation on the first topic information, the first topic information being related to the first media content.

In some embodiments, the first topic information being related to the first media content comprises: the first topic information being related to a first time point of the first media content and a second time point of the first media content; and the second media content comprises media content starting from the first time point and ending at the second time point.

In some embodiments, the playing of the second media content corresponding to the first topic information in the first topic information set through the play control in response to detecting the first trigger operation on the first topic information comprises: playing the first media content from the first time point through the play control in response to detecting the first trigger operation on the first topic information in the first topic information set.

In some embodiments, the processing module 403 is further configured to control, after the play module 401 plays the first media content in the interaction interface through the play control, the topic control to display the first topic information through the display module 402 in a case where the first media content is played through the play control to a time point between the first time point and the second time point.

In some embodiments, the processing module 403 is further configured to determine a play time point for playing the first media content through the play control in response to detecting the first trigger operation on the first topic information in the first topic information set; the display module 402 is further configured to display a cancel control in the play control after the second media content corresponding to the first topic information is played through the play control; and the processing module 403 is further configured to control the play control to play the first media content from the play time point through the play module 401 in response to detecting a trigger operation on the cancel control.

In some embodiments, the play control occupies an upper portion of the interaction interface; and the displaying of the first topic information set comprises displaying the first topic information set in a lower portion of the interaction interface in a form of a list.

In some embodiments, the processing module 403 is further configured to control, after the display module displays the first topic information set, display of a second topic information set through the display module 402 in response to detecting a second trigger operation on the first topic information in the first topic information set; the processing module 403 is further configured to control the play control to play third media content corresponding to second topic information in the second topic information set through the play module 401 in response to detecting a trigger operation on the second topic information, the second topic information being related to the first topic information.

In some embodiments, the playing of the third media content corresponding to the second topic information through the play control comprises playing the third media content through the play control in a full screen mode; the processing module 403 is further configured to display associated information of the third media content in the play control through the play module 401 in a case where the associated information is obtained; and the processing module 403 is further configured to display interaction information in the play control through the play module 401 in a case where the interaction information is input through an input control.

In some embodiments, the processing module 403 is further configured to determine a play time point for playing the first media content through the play control in response to detecting the trigger operation on the second topic information in the second topic information set; the play module 401 is further configured to display a cancel control in the play control after the third media content corresponding to the second topic information is played through the play control; and the processing module 403 is further configured to control the play control to play the first media content from the play time point through the play module 401 in response to detecting a trigger operation on the cancel control.

The apparatus shown in FIG. 4 may perform the method of the embodiment shown in FIG. 1, and for the part not described in detail in the embodiment, reference may be made to the relevant description of the embodiment shown in FIG. 1. For the performing process and technical effect of the technical solution, reference may be made to the description of the embodiment shown in FIG. 1, which will not be described in detail here.

Figure 5:
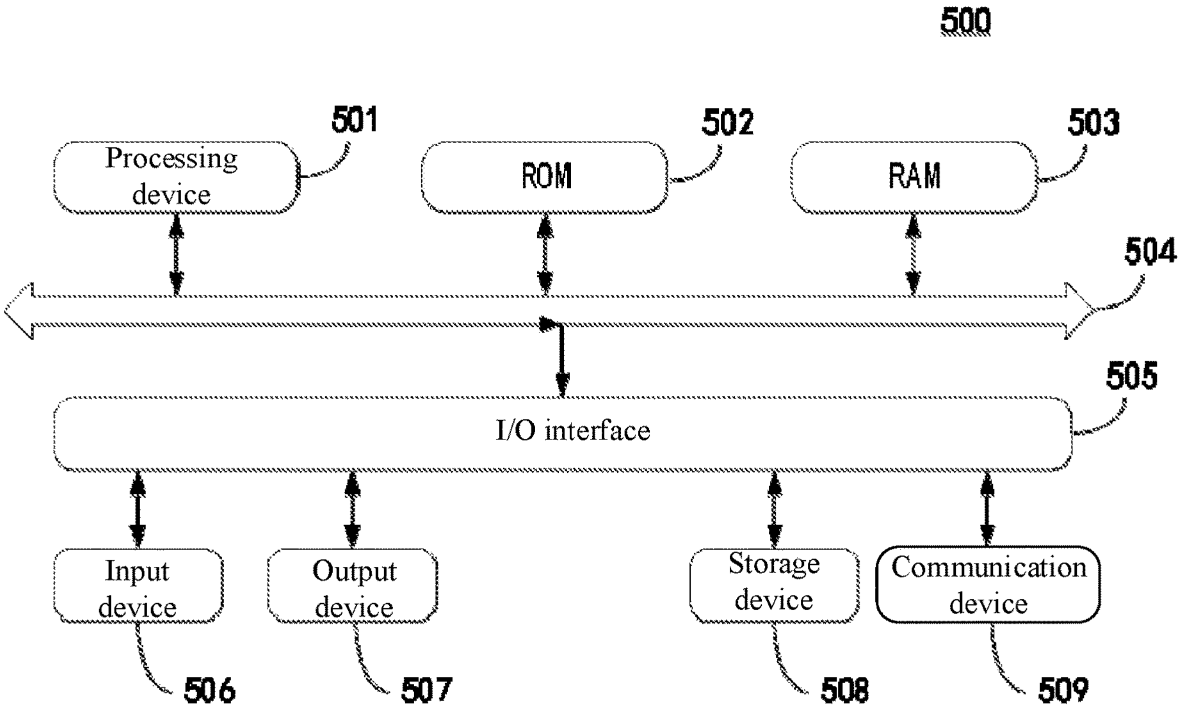
FIG. 5 is a schematic view of a structure of an electronic device provided according to an embodiment of the present disclosure.

Next, refer to FIG. 5, which shows a schematic view of a structure of an electronic device 500 suitable for implementing an embodiment of the present disclosure. The terminal device in embodiments of the present disclosure may comprise, but is not limited to, a mobile terminal such as a mobile phone, a notebook computer, a digital broadcast receiver, a PDA (personal digital assistant), a PAD (tablet computer), a PMP (Portable Multimedia Player), an in-vehicle terminal (for example, an in-vehicle navigation terminal); and a fixed terminal such as digital a TV, a desktop computer or the like. The electronic device shown in FIG. 5 which is only an example, shall not limit the function and use scope of the embodiments of the present disclosure.

As shown in FIG. 5, the electronic device 500 may comprise a processing device (for example, a central processing unit, a graphic processor, or the like) 501, which can perform various suitable actions and processing according to a program stored in a Read-only Memory (ROM) 502 or a program loaded from a storage device 508 into a Random Access Memory (RAM) 503. In the RAM 503, various programs and data required for the operation of the electronic device 500 are also stored. The processing device 501, the ROM 502 and the RAM 503 are connected to each other through a communication line 504. The input/output (I/O) interface 505 is also connected to the communication line 504.

Generally, the following devices may be connected to the I/O interface 505: an input device 506 comprising, for example, a touch screen, a touch pad, a keyboard, a mouse, a camera, a microphone, an accelerometer, a gyroscope, or the like; an output device 507 comprising, for example, a Liquid Crystal Display (LCD), a speaker, a vibrator, or the like; a storage device 508 comprising, for example, a magnetic tape, a hard disk, or the like; and a communication device 509. The communication device 509 may allow the electronic device 500 to be in wireless or wired communication with other devices to exchange data. Although FIG. 5 shows the electronic device 500 with various devices, it should be understood that it is not required to implement or have all the devices shown. It is possible to alternatively implement or have more or less devices.

In particular, according to an embodiment of the present disclosure, the process described above in conjunction with the flowchart may be implemented as a computer software program. For example, an embodiment of the present disclosure comprises a computer program product, which comprises a computer program carried on a non-transitory computer-readable medium, wherein the computer program contains program codes for executing the method shown in the flowchart. In such embodiment, the computer program may be downloaded and installed from the network through the communication device 509, installed from the storage device 508, or installed from the ROM 502. When the computer program is executed by the processing device 501, the above-described functions defined in the method of the embodiment of the present disclosure are executed.

It is to be noted that, the above-described computer-readable medium of the present disclosure may be a computer-readable signal medium, a computer-readable storage medium or any combination thereof. The computer-readable storage medium may be, for example, but is not limited to: an electrical, magnetic, optical, electromagnetic, infrared, or semiconductor system, apparatus, or device, or a combination thereof. More specific examples of the computer-readable storage medium may comprise, but is not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium that contains or stores a program, wherein the program may be used by an instruction execution system, apparatus, or device or used in combination therewith. In the present disclosure, the computer-readable signal medium may comprise a data signal propagated in a baseband or as a part of a carrier wave, wherein a computer-readable program code is carried. Such propagated data signal may take many forms, comprising but not limited to an electromagnetic signal, an optical signal, or any suitable combination thereof. The computer-readable signal medium may also be any computer-readable medium other than the computer-readable storage medium. The computer-readable signal medium may send, propagate, or transmit a program for use by an instruction execution system, apparatus, or device or in combination with therewith. The program code contained on the computer-readable medium may be transmitted by any suitable medium, comprising but not limited to: a wire, an optical cable, radio frequency (RF), or the like, or any suitable combination thereof.

In some embodiments, the client and the server may communicate using any currently known or future developed network protocol such as HTTP (HyperText Transfer Protocol), and may be interconnected with digital data communication (for example, communication network) in any form or medium. Examples of communication networks comprise a Local Area Network ("LAN"), a Wide Area Network ("WAN"), an inter-network (for example, Internet) and an end-to-end network (for example, an ad hoc end-to-end network), as well as any currently known or future developed network.

The above-described computer-readable medium may be comprised in the above-described electronic device; or may also exist alone without being assembled into the electronic device.

The above-described computer-readable medium carries one or more programs, wherein the one or more programs, when executed by the electronic device, cause the electronic device to: perform the interaction method in the above-described embodiments.

The computer program code for performing the operations of the present disclosure may be written in one or more programming languages or a combination thereof. The above-described programming language comprises but are not limited to an object-oriented programming language, such as Java, Smalltalk, or C++, and also comprises conventional procedural programming languages, such as "C" language or similar programming languages. The program code may be executed entirely on the computer of the user, partly on the computer of the user, executed as an independent software package, partly on the computer of the user and partly executed on a remote computer, or entirely executed on the remote computer or server. In the case of a remote computer, the remote computer may be connected to the computer of the user through any kind of network (comprising a local area network (LAN) or a wide area network (WAN)), or may be connected to an external computer (for example, connected through Internet using an Internet service provider).

The flowcharts and block views in the accompanying drawings illustrate the possibly implemented architectures, functions, and operations of the system, method, and computer program product according to various embodiments of the present disclosure. In this regard, each block in the flowchart or block view may represent a module, a program segment, or a part of code, wherein the module, the program segment, or the part of code contains one or more executable instructions for realizing a specified logic function. It should also be noted that, in some optional implementations, the functions marked in the block may also occur in a different order from the order marked in the accompanying drawings. For example, two blocks shown in succession which may actually be executed substantially in parallel, may sometimes also be executed in a reverse order, depending on the functions involved. It should also be noted that each block in the block view and/or flowchart, and a combination of the blocks in the block view and/or flowchart, may be implemented by a dedicated hardware-based system that performs the specified functions or operations, or may be implemented by a combination of dedicated hardware and computer instructions.

The units involved in the described embodiments of the present disclosure may be implemented in software or hardware. Names of the units do not constitute a limitation on the units themselves under certain circumstances.

The functions described hereinabove may be performed at least in part by one or more hardware logic components. For example, without limitation, the hardware logic component of a demonstrative type that may be used comprises: a Field Programmable Gate Array (FPGA), an Application Specific Integrated Circuit (ASIC), an Application Specific Standard Product (ASSP), a System on Chip (SOC), a Complex Programmable Logical device (CPLD) or the like.

The context of the present disclosure, a machine-readable medium may be a tangible medium, which may contain or store a program for use by the instruction execution system, apparatus, or device or use in combination with the instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, device or device, or any suitable combination thereof. More specific examples of the machine-readable storage medium may comprise an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

According to one or more embodiments of the present disclosure, an electronic device is provided. The electronic device comprises: at least one processor; and a memory communicatively connected to the at least one processor; wherein the memory stores instructions capable of being executed by the at least one processor, wherein the instructions, when executed by the at least one processor, causes the at least one processor to perform any of the interaction methods in the aforementioned first aspect.

According to one or more embodiments of the present disclosure, a non-transitory computer-readable storage medium is provided. The non-transitory computer-readable storage medium stores computer instructions configured to causes a computer to perform any of the interaction methods in the aforementioned first aspect.

According to one or more embodiments of the present disclosure, a computer program is provided. The computer program comprises: instructions that, when executed by a processor, cause the processor to perform the aforementioned method.

According to one or more embodiments of the present disclosure, a computer program product is provided. The computer program product comprises: instructions that, when executed by a processor, cause the processor to perform the aforementioned method.

The above description is only an explanation of preferred embodiments of the present disclosure and the applied technical principles. Those skilled in the art should understand that the scope of disclosure involved in the present disclosure is not limited to the technical solutions formed by the specific combination of the above technical features, and at the same time should also cover other technical solutions by formed arbitrarily combining the above-described technical features or equivalent features without departing from the above disclosed concept. For example, the above-described features and the technical features disclosed in the present disclosure (but not limited thereto) having similar functions are replaced with each other to form a technical solution.

What is claimed is:

1. An interaction method, comprising:

playing first media content in an interaction interface displayed on a screen of a terminal device through a play control, the interaction interface comprising a topic control;

displaying a first topic information set in the interaction interface in response to detecting a trigger operation on the topic control through the terminal device, wherein the first topic information set comprises one or more topic information items, the one or more topic information items are text information items;

displaying, after the first media content is played in the interaction interface through the play control, first topic information through the topic control in a case where the first media content is played through the play control to a time point between a first time point and a second time point;

playing second media content corresponding to the first topic information in the first topic information set through the play control in response to detecting a first trigger operation on the first topic information through the terminal device, the first topic information being a text information item related to a subject of the first media content;

displaying, after the first topic information set is displayed, a second topic information set in response to detecting a second trigger operation on the first topic information in the first topic information set; and playing third media content corresponding to second topic information in the second topic information set through the play control in response to detecting a trigger operation on the second topic information, the second topic information being related to the first topic information, wherein the first topic information is related to the first time point of the first media content and the second time point of the first media content, the second media content comprises media content starting from the first time point and ending at the second time point in the first media content, and the third media content does not comprise media content in the first media content; and the playing of the second media content corresponding to the first topic information through the play control in response to the first trigger operation comprises: playing the first media content from the first time point through the play control in response to detecting the first trigger operation on the first topic information in the first topic information set.

2. The interaction method according to claim 1, further comprising:

determining a play time point for playing the first media content through the play control in response to detecting the first trigger operation on the first topic information in the first topic information set;

displaying a cancel control in the play control after the second media content corresponding to the first topic information is played through the play control; and playing the first media content from the play time point through the play control in response to detecting a trigger operation on the cancel control.

3. The interaction method according to claim 1, wherein:

the play control occupies an upper portion of the interaction interface; and the displaying of the first topic information set comprises displaying the first topic information set in a lower portion of the interaction interface in a form of a list.

4. The interaction method according to claim 1, wherein:

the playing of the third media content corresponding to the second topic information through the play control comprises playing the third media content through the play control in a full screen mode; and the interaction method further comprises:

displaying associated information of the third media content in the play control in a case where the associated information is obtained; and displaying interaction information in the play control in a case where the interaction information is input through an input control.

5. The interaction method according to claim 1, further comprising:

determining a play time point for playing the first media content through the play control in response to detecting the trigger operation on the second topic information in the second topic information set;

displaying a cancel control in the play control after the third media content corresponding to the second topic information is played through the play control; and playing the first media content from the play time point through the play control in response to detecting a trigger operation on the cancel control.

6. An electronic device, comprising:

a memory configured to store computer-readable instructions; and a processor configured to execute the computer-readable instructions to cause the electronic device to:

play first media content in an interaction interface displayed on a screen of a terminal device through a play control, the interaction interface comprising a topic control;

display a first topic information set in the interaction interface in response to detecting a trigger operation on the topic control through the terminal device, wherein the first topic information set comprises one or more topic information items, the one or more topic information items are text information items;

display, after the first media content is played in the interaction interface through the play control, first topic information through the topic control in a case where the first media content is played through the play control to a time point between a first time point and a second time point;

play second media content corresponding to the first topic information in the first topic information set through the play control in response to detecting a first trigger operation on the first topic information through the terminal device, the first topic information being a text information item related to a subject of the first media content;

display, after the first topic information set is displayed, a second topic information set in response to detecting a second trigger operation on the first topic information in the first topic information set; and play third media content corresponding to second topic information in the second topic information set through the play control in response to detecting a trigger operation on the second topic information, the second topic information being related to the first topic information, wherein the first topic information is related to the first time point of the first media content and the second time point of the first media content, the second media content comprises media content starting from the first time point and ending at the second time point in the first media content, and the third media content does not comprise media content in the first media content; and the processor is configured to execute the computer-readable instructions to cause the electronic device to play the first media content from the first time point through the play control in response to detecting the first trigger operation on the first topic information in the first topic information set.

7. A non-transitory computer-readable storage medium for storing computer-readable instructions that, when executed by a computer, cause the computer to play first media content in an interaction interface displayed on a screen of a terminal device through a play control, the interaction interface comprising a topic control;

display a first topic information set in the interaction interface in response to detecting a trigger operation on the topic control through the terminal device, wherein the first topic information set comprises one or more topic information items, the one or more topic information items are text information items;

display, after the first media content is played in the interaction interface through the play control, first topic information through the topic control in a case where the first media content is played through the play control to a time point between a first time point and a second time point;

play second media content corresponding to the first topic information in the first topic information set through the play control in response to detecting a first trigger operation on the first topic information through the terminal device, the first topic information being a text information item related to a subject of the first media content;

display, after the first topic information set is displayed, a second topic information set in response to detecting a second trigger operation on the first topic information in the first topic information set; and play third media content corresponding to second topic information in the second topic information set through the play control in response to detecting a trigger operation on the second topic information, the second topic information being related to the first topic information, wherein the first topic information is related to the first time point of the first media content and the second time point of the first media content, the second media content comprises media content starting from the first time point and ending at the second time point in the first media content, and the third media content does not comprise media content in the first media content; and the computer-readable instructions, when executed by the computer, cause the computer to play the first media content from the first time point through the play control in response to detecting the first trigger operation on the first topic information in the first topic information set.

8. The electronic device according to claim 6, wherein the processor is further configured to execute the computer-readable instructions to cause the electronic device to:

determine a play time point for playing the first media content through the play control in response to detecting the first trigger operation on the first topic information in the first topic information set;

display a cancel control in the play control after the second media content corresponding to the first topic information is played through the play control; and play the first media content from the play time point through the play control in response to detecting a trigger operation on the cancel control.

9. The electronic device according to claim 6, wherein:

the play control occupies an upper portion of the interaction interface; and the processor is further configured to execute the computer-readable instructions to cause the electronic device to display the first topic information set in a lower portion of the interaction interface in a form of a list.

10. The non-transitory computer-readable storage medium according to claim 7, wherein the computer-readable instructions, when executed by the computer, further cause the computer to:

determine a play time point for playing the first media content through the play control in response to detecting the first trigger operation on the first topic information in the first topic information set;

display a cancel control in the play control after the second media content corresponding to the first topic information is played through the play control; and play the first media content from the play time point through the play control in response to detecting a trigger operation on the cancel control.

* * * * *